| United States Patent [19] | [11] | Patent Number: | 4,879,006 |
|---|---|---|---|
| Turner | [45] | Date of Patent: | Nov. 7, 1989 |

[54] LIQUID TREATMENT PROCESS

[75] Inventor: Andrew D. Turner, Abingdon, United Kingdom

[73] Assignee: United Kingdom Atomic Energy Authority, Oxfordshire, England

[21] Appl. No.: 228,510

[22] Filed: Aug. 5, 1988

[30] Foreign Application Priority Data

Aug. 12, 1987 [GB] United Kingdom ............... 8719045

[51] Int. Cl.$^4$ .................... C25C 1/22; C25C 3/34; C25D 3/54; C25D 5/32

[52] U.S. Cl. ................... 204/1.5; 252/631; 210/682; 210/748; 423/2; 423/6; 423/22; 204/109

[58] Field of Search ............... 204/1.5, 44.5, 47, 109, 204/140; 423/2, 3, 6, 7, 22, 49

[56] References Cited

U.S. PATENT DOCUMENTS

| | | | |
|---|---|---|---|
| 3,616,275 | 4/1969 | Schneider et al. ................... | 204/1.5 |
| 3,891,741 | 6/1975 | Carlin et al. ...................... | 423/2 |
| 3,922,231 | 11/1975 | Carlin et al. ..................... | 204/1.5 |
| 4,021,313 | 5/1977 | Hausberger et al. ................ | 204/1.5 |
| 4,069,293 | 1/1978 | Tallent ........................... | 423/3 |
| 4,129,481 | 12/1978 | Aubert et al. ..................... | 204/1.5 |
| 4,316,776 | 2/1982 | Tallent et al. .................... | 204/1.5 |
| 4,341,602 | 7/1982 | Nenner et al. .................... | 204/1.5 |
| 4,371,505 | 2/1983 | Pautrot .......................... | 423/10 |

*Primary Examiner*—Howard J. Locker
*Attorney, Agent, or Firm*—Larson & Taylor

[57] ABSTRACT

Ruthenium in aqueous solution in a first, oxidizable oxidation state (e.g. as $RuNO(NO_3)_3$) is converted to an insoluble form in a second, different oxidation state (e.g. as $RuO_2.nH_2O$) by establishing an electrochemical cell wherein the solution is the electrolyte and electrochemically oxidizing and reducing the ruthenium in the cell. The insoluble form may be filtered from the liquid. The ruthenium treatment may be a stage in the removal of radioactive species from liquids such is in the treatment of medium and low level activity liquid waste streams, wherein actinides are precipitated and filtered off either before or after ruthenium treatment. Subsequently, residual activity may be removed from the stream by either or both of (a) absorption, followed by filtration and electro-osmotic dewatering and (b) electrochemical ion exchange. Filtration fluxes may be maintained by direct electrochemical membrane cleaning.

6 Claims, No Drawings

LIQUID TREATMENT PROCESS

This invention relates to the treatment of ruthenium in aqueous solution to convert it to an insoluble form, for example as a stage in the removal of radioactive species from liquids such as in the treatment of medium and low level activity liquid waste streams.

The term radioactive waste covers a range of solid, liquid and gaseous materials arising from the preparation and use of radioactive substances in medicine, industry and research, and from the use of nuclear power to generate electricity. Wastes are generally classified in terms of their level of radioactivity as high, intermediate (or medium) or low level. High level wastes contain most of the fission products and actinides (except plutonium) from the nuclear fuel cycle and are characterised by a high rate of heat emission but low bulk; medium level wastes contain some fission and activation products and sometimes actinides with long half-lives and are characterised by a low rate of heat emission but considerable bulk; low level wastes contain mostly short-lived radionuclei with insignificant quantities of materials with long half-lives, and are normally of a large volume.

The use of water as a process medium in nuclear plants inevitably gives rise to the production of medium and low level activity liquid waste streams. Immobilising these without further treatment would give a large volume of solid waste for disposal, whereas evaporation of such large volumes of water as arise would be very energy intensive. Both of these approaches would thus be very expensive to operate.

A method has now been devised for treating an aqueous medium containing ruthenium dissolved therein, such as medium and low level activity liquid waste, which, in combination with other process stages, can selectively reconcentrate active species into a small volume of higher level waste so that the bulk of inactive materials can be safely discharged. Thus, the invention includes a method of converting ruthenium present in aqueous solution in a first and oxidisable oxidation state to an insoluble form in a second and different oxidation state, which method comprises establishing an electrochemical cell wherein the solution is the cell electrolyte and electrochemically oxidising and then electrochemically reducing the ruthenium in the cell.

The first oxidation state of ruthenium is preferably $+2$ and the second oxidation state is preferably $+4$, the insoluble form of ruthenium being ruthenium(IV) oxide ($RuO_2$), including hydrates thereof. It is believed that ruthenium in the first oxidation state is electrochemically oxidised to a third oxidation state, higher than the second oxidation state, e.g. $+8$ as in $RuO_4$, which is then electrochemically reduced to the second oxidation state. It is also preferred that the aqueous solution contains nitrate ions.

The electrochemical oxidation and reduction may, for example, be performed by repeatedly reversing the polarity of the cell or by causing the solution to flow through the cell when the electrodes of which are each at a fixed potential. The material of which the electrodes are constructed may be significant in facilitating the electrochemical oxidation and reduction. Thus, the material may be selected to have a catalytic effect therein.

If desired, the insoluble form of the ruthenium may be filtered from the liquid, the filtration flux being maintained, if necessary, by direct electrochemical membrane clearing.

The method of the invention may be used as a stage in the treatment of a medium and/or low level activity liquid waste to reduce the concentration of actinides, ruthenium and the level of $\beta\gamma$ activity therein. Thus, either before or after the method of the invention is performed, the liquid waste may be treated with an aqueous alkali solution to precipitate one or more actinides and the precipitate filtered from the liquid, the filtration flux being maintained, if necessary, by direct electrochemical membrane cleaning. Precipitating actinides in this way is known and is described in BNES 1982, pp. 303–311 in a report of an International Conference on Fast Reactor Fuel Cycles, London 1981 by R. H. Allardice.

In a further stage in the treatment of a medium and/or low level activity liquid waste, the waste may be further treated to remove any residual activity therefrom by either or both of the following steps (a) and (b) comprising (a) absorbing nuclides in the liquid possessing $\alpha$ and/or $\beta$ and/or $\gamma$ activity on an absorbent material, followed by filtering the absorbent material from the liquid, the filtration flux being maintained, if necessary, by direct electrochemical membrane cleaning, and then electro-osmotic dewatering, and (b) electrochemical ion exchange. The absorbent material, if used, may remove any lower level $\alpha$ activity and may comprise one or more of a floc, a floc precipitated in situ, and an inorganic ion exchange material. When absorbent material is used, it may be necessary to carry out a washing step after filtration and before electro-osmotic dewatering; this is to reduce the electrical conductivity to a level suitable for electro-osmotic dewatering to be carried out.

Where the above-mentioned stages and steps involve electrical processes, they have the advantage of being controllable remotely and automatically by applied voltage. Also, using electrons rather than inactive chemical reagents helps reduce the amount of material needing controlled disposal. Direct electrical membrane cleaning and electro-osmotic dewatering are known electrical processes for enhancing solid/liquid separation and electrochemical ion exchange is a known electrical process for treating the dissolved ionic content of an aqueous medium.

Direct electrical membrane cleaning is a way of maintaining filtration flux at a filter in the form of an electrically conducting membrane when a liquid stream to be filtered is passed therethrough. Short electrical pulses are periodically applied between the filter (e.g. a stainless steel microfilter) and an auxiliary electrode, the liquid stream acting as electrolyte. Microscopic gas bubbles are formed at the filter by the resulting electrolysis to clean the filter by removing any superficial fouling layer thereon without interrupting the filtration. To avoid the need for large power supplies to clean all of the filter (membrane) area at once, a small power supply may be used continuously to clean only a small fraction of the filter area at a given time and be switched from one part of the filter to another sequentially. Direct electrical membrane cleaning is described in GB-A-2 160 545 (corresponding to US-A-4 624 760).

Electro-osmotic dewatering is an electrical thickening process for slurries wherein water from an aqueous slurry is caused, by application of an electric field, to pass electro-osmotically through a non-conducting waterpermeable membrane in preference to solid matter. It is described in GB-A-1 414 564 and its use for dewatering a flowing aqueous particulate dispersion and a cross-flow apparatus therefor are described in GB-A-2 141 737. Since no transmembrane pressure is required, high solids contents (e.g. 30%) may be achieved at rapid permeation fluxes.

Electrochemical ion exchange, also known as electrochemical deionisation, is a process for the electrochemical removal of ions from aqueous solutions. It involves establishing an electrochemical cell comprising the aqueous solution (or feed) as electrolyte, a working electrode and a counter electrode, where at least the working electrode includes an ion exchange material such as a resin, and applying a DC potential to the working electrode. To remove cations from the solution, a cathodic potential is applied to the working electrode being a cation responsive electrode. A localised change of pH is thereby produced at the electrode due to generation of $OH^-$ ions which in turn produce active sites thereon for adsorption of cations from the aqueous solution. The working electrode may be regenerated by reversing its polarity, i.e. without adding chemical compounds; this causes the adsorbed cations to be eluted into an aqueous medium.

The use of electrochemical ion exchange to give a concentrated stream requires the expenditure of significantly less energy than evaporation. Electrochemical ion exchange is described in GB-A-1 247 732 (corresponding to US-A-3 533 929), its use in the treatment of flowing streams in GB-A-2 150 597 (corresponding to US-A-4 596 641), and electrodes for use therein in GB-A-2 150 598 (corresponding to US-A-4 548 695). Also, selective electrochemical ion exchange is described in GB-A-2 187 761.

Particular ways of carrying out the invention will now be described by way of example only.

EXAMPLE 1

A 1 mM solution of $RuNO(NO_3)_3$ in 0.33M aqueous $NaNO_3$ was used as the electrolyte in an electrochemical cell having a platinised titanium electrode. The electrode was rapidly cycled at ambient temperature between the potential limits for hydrogen and oxygen evolution referenced against a saturated calomel electrode (SCE).

It was found that ruthenium had been removed from the solution down to the detection limit of an atomic absorption spectrophotometer (less than 0.1 ppm) to give a decontamination factor of greater than 1000. The $Ru(NO)^{3+}$ ions in solution had been converted to insoluble $RuO_2 \cdot nH_2O$, the mechanism, it is believed, involving formation of a reactive intermediate $RuO_4$. The size of the $RuO_2 \cdot nH_2O$ particles appeared to depend on the duration of cycling.

EXAMPLE 2

A $RuNO(NO_3)_3$ solution as used in Example 1 was caused to flow, as cell electrolyte, between two platinised titanium electrodes as cell anode and cathode respectively at a fixed potential. A sufficiently large positive potential to facilitate electrochemical oxidation of $Ru(NO)^{3+}$ ions to $RnO_4$ was applied to the anode. The $RuO_4$ remained in solution until it reached the cathode where it was electrochemically reduced to $RuO_2 \cdot nH_2O$, which appeared as a black precipitate. The decontamination factor was measured and found to be similar to that obtained in Example 1.

The procedures of Examples 1 and 2 were found to be thermodynamically feasible over a wide pH range (3–12), though reaction rates appeared to be retarded in very alkaline solution, e.g. pH 13–14.

If desired the precipitates produced in Examples 1 and 2 were removed, for example by passing the resulting mixture through a stainless steel microfilter and maintaining filtration flux by electrochemical membrane cleaning.

EXAMPLE 3

An aqueous waste stream was treated as follows. The stream, for example, 0.3 M in $NaNO_3$, contained of the order of 10 $GBq/m^3$ of $\beta\gamma$ activity, which activity arose primarily from the presence of Ru, with lesser amounts of Cs, Ce, Sr and other active nuclides. Uranium was also present at a level of less than 1 g/l.

Stage (i)

Aqueous sodium hydroxide solution (6M) was added to an aqueous waste stream to pH 10 to precipitate sodium uranate. U, Pu, Am as well as other elements that form insoluble hydroxides at pH 10, e.g. Fe, Ce, were thereby removed.

The sodium hydroxide solution was essentially carbonate free to prevent carbonate complex formation of U, Pu. Also, if carbonate is present in the waste stream, it is removed by acidifying to a pH of less than 4 before the stream is treated. The sodium hydroxide solution was added slowly during precipitation to growth of crystallites. If desired, extra U can be added before adding the sodium hydroxide solution to increase the Pu decontamination factor further.

The precipitate was removed by filtering with a stainless steel microfilter, the filtration flux being maintained by electrochemical membrane cleaning. A slurry product of 25% was obtained.

Stage (ii)

Ru was removed from the waste stream as described in either of Examples 1 and 2 above.

Stage (iii)

Either or both of steps (a) and (b) below were performed.

(a) Nickel ferrocyanide or Zeolite IE96 were added to the waste stream to absorb Cs, sodium titanate or zirconium phosphate added to absorb Sr, and $MnO_2$ or hydrous titania added to absorb Ru and/or Ce. $Fe(OH)_3$ was subsequently precipitated to produce a flocculated slurry that was then filtered as described for stage (i) above. The $Fe(OH)_3$ also served to further reduce any alpha activity. The slurry was then washed to bring its electrical conductivity to a value suitable for it to be electro-osmotically dewatered, which was then done using a cross-flow module. The $\beta\gamma$ activity was reduced to less than 0.5 $MBq/m^3$.

(b) The waste stream was treated using two electrochemical ion exchange modules in parallel wherein one module absorbs while the other elutes over a 14 day half cycle. The ion exchange materials used were zirconium phosphate or Zeolite IE96.

We claim:

1. A method of converting dissolved ruthenium present in aqueous solution in a first oxidisable oxidation state to ruthenium (IV) oxide, which method comprises establishing an electrochemical cell wherein the solution is the cell electrolyte, and subjecting the ruthenium in the solution in said cell to electrochemical oxidation and to electrochemical reduction thereby to convert the ruthenium to the +4 oxidation state and give rise to the ruthenium (IV) oxide.

2. A method according to claim 1 wherein the electrochemical oxidation and reduction are performed by repeatedly reversing the polarity of the cell.

3. A method according to claim 1 wherein the solution is caused to flow through the cell, the electrodes of which are each at a fixed potential.

4. A method according to claim 1 wherein the insoluble form of the ruthenium is filtered from the liquid, the filtration flux being maintained by direct electrochemical membrane cleaning.

5. A method according to claim 1 as a stage in the treatment of a medium or low level activity liquid waste to reduce the concentration of actinides, ruthenium and the level of $\beta\gamma$ activity therein, wherein, either before or after the method of claim 1 is carried out, the liquid waste is treated with an aqueous alkali solution to precipitate one or more actinides and the precipitate filtered from the liquid, filtration being maintained at a desired rate by direct electrochemical membrane cleaning.

6. A method according to claim 5 wherein the liquid waste is further treated to remove any residual activity therefrom, said further treatment comprising at least one of the following steps:

(a) absorbing nuclides in the liquid possessing $\alpha$, $\beta$ or $\gamma$ activity on an absorbent material, followed by filtering the absorbent material from the liquid, filtration being maintained at a desired rate by direct electrochemical membane cleaning, and then electro-osmotic dewatering; and (b) electrochemical ion exchange.

* * * * *